Figure 1:
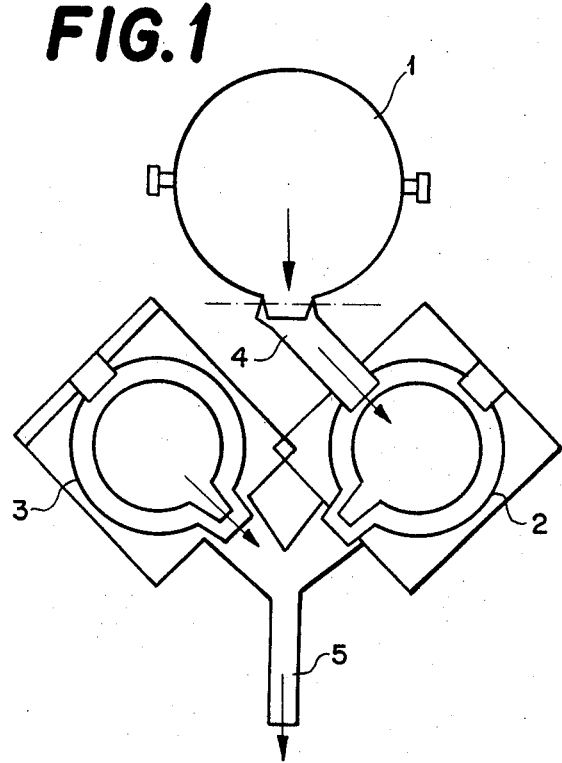

United States Patent [19]
Berthet et al.

[11] 3,773,218
[45] Nov. 20, 1973

[54] METHOD OF REGULATING MOLTEN METAL SUPPLY

[75] Inventors: Aristide Berthet; Jacques Blum, both of Metz, France

[73] Assignee: Institut De Recherches De La Sidergie Francaise (IRSID), Saint Germain-En-Laye, France

[22] Filed: Mar. 1, 1972

[21] Appl. No.: 230,746

[30] Foreign Application Priority Data
Mar. 2, 1971 France .............................. 7107098

[52] U.S. Cl. ........................ 222/1, 164/155, 222/56
[51] Int. Cl. ............................................ B22d 37/00
[58] Field of Search ..................... 164/8.2, 155, 281, 164/154; 222/1, 56, DIG. 15

[56] References Cited
UNITED STATES PATENTS
3,457,985 7/1969 Wilson .............................. 164/155
2,905,989 9/1959 Black .................................. 164/155

*Primary Examiner*—Robert B. Reeves
*Assistant Examiner*—David A. Scherbel
*Attorney*—Milton J. Wayne et al.

[57] ABSTRACT

Method and apparatus for maintenance of a constant supply of molten metal in metallurgical equipment. A supply ladle alternately feeds into one of two intermediate tipping vessels. The tipping of one vessel is initiated when a predetermined emptying value of the other vessel is reached, and the flow of metal flowing from the one vessel is brought to a zero value when the flow of metal flowing from the one vessel is detected. Vessels in operative position are continuously weighed to generate a voltage signal that corresponds to the emptying weight, and this signal is compared with a reference voltage signal so that a differential voltage produced thereby can control the rate of tipping of one of the vessels.

6 Claims, 2 Drawing Figures

METHOD OF REGULATING MOLTEN METAL SUPPLY

BROAD STATEMENT OF INVENTION

This invention relates to regulation of the feed supply of molten metal and is particularly concerned with a plurality of alternately tipping and filling intermediate vessels maintaining a constant flow.

DESCRIPTION OF THE PRIOR ART

A certain number of proposals have heretofore been made with a view to achieving constant molten metal flow. One of these consists in feeding an intermediate vessel by means of a large-capacity ladle the bottom of which is fitted with a nozzle which can be opened or closed by means of a plug. The intermediate vessel is mounted on a weighing mechanism and includes in its lower part a flow outlet constituted by a calibrated nozzle. The regulation of flow is obtained by maintaining the level of metal in the intermediate vessel between two fixed limits. The continual weighing of this vessel enables determination of any difference in flow in relation to the desired quantity and the bringing of the flow back to the desired quantity by maintaining the level between the limits in the intermediate vessel. It will be understood that variations in flow caused by a modification of the diameter of the flow outlet may thus be corrected to some extent. It is equally apparent that, where large modifications of the diameter are involved, it is no longer possible to bring the flow back to the desired quantity. Moreover, the reliability of the device is linked to the care of the plug and the seating of the nozzle. The wear of the nozzle may cause variation in the flow if operations of long duration, possibly as long as a week, are involved. In addition, the formation of defects in the nozzle, or at the outlet from the nozzle, is a possibility, and these defects may modify the flow conditions and sometimes bring about stoppage of the supply.

It is further known to flow measured quantities of metal into molds by way of intermediate vessels which are filled with metal and are emptied by tipping. The mass of metal is determined by the weighing of the intermediate vessels. However, these devices operate only in a discontinuous manner and do not at all assure continuous and regular flow of molten metal.

DESCRIPTION OF THE INVENTION

The object of the present invention is to obviate or mitigate the disadvantages of changing molten metal supply and to provide a method of an apparatus for achieving, from tipping vessels, a predetermined and regular flow of such metal.

According to the present invention, a method of supplying a substantially constant flow of metal to a metallurgical plant is provided from at least two intermediate tipping vessels, comprising tipping a filled intermediate vessel to obtain a flow of metal, continuously weighing the vessel as it is being tipped so as to determine the flow of metal running out of said vessel, comparing the flow of metal with a reference quantity representing a constant flow of metal, developing from the determined flow and the reference quantity a differential signal, adjusting the rate of tipping of the intermediate vessel while metal is running out therefrom so as to bring said differential signal back to a substantially zero value, stopping the tipping of the intermediate vessel while metal is running out therefrom, and initiating the tipping of another filled vessel when the first vessel from which metal is running out reaches a predetermined degree of emptying.

Preferably, the method includes detecting the appearance of flow of metal from the one vessel at the start of tipping, developing a signal at the moment when such flow of metal appears and initiating through this signal the elimination of the flow of metal from the other vessel at the end of tipping and the taking over by regulation equipment of the control of the rate of tipping of the one vessel at the start of tipping.

Alternatively, the method includes detecting the appearance of flow of metal from one of two intermediate vessels at the start of tipping, developing a signal at the instant such flow appears, and, by means of such signal, controlling stoppage of the tipping of the other vessel, the metal continuing to be emptied from the other vessel at a decreasing rate, initiating control by regulation equipment of the vessel at the start of tipping through summing the flows running out of the two intermediate vessels, and acting on the flow from the vessel controlled by the regulation equipment so as to regulate the total flow.

The signal for stopping the tipping may equally well be generated by a weight limit of the vessels or a geometrical position of the vessels.

Further, according to the present invention, apparatus is provided for supplying a substantially constant flow of metal to a metallurgical plant, comprising means for detecting the appearance of the flow of metal discharging from the intermediate vessels, means for weighing each vessel being discharged and determining the actual flow of metal, means for providing a reference quantity corresponding to a constant feed flow, comparison means for developing a differential signal by comparing the actual flow and the constant feed flow, and means for controlling the tipping rate of the vessel being made operative by the differential signal developed by the comparison means.

It will be understood that the present invention eliminates any outflow orifice and avoids in this way any risk of stoppage arising from deterioration of such an orifice. The reliability of the equipment is thereby improved; the regularity of the flow proves however to be more difficult to achieve in consequence of the discharge of the metal through tipping of the vessel. The present invention is therefore seen to provide a method of supply in which the flow of metal is controlled in a very careful manner, in such a way as to quickly compensate for possible variations in the flow.

In order to obtain a continuous flow of molten metal, for example, from a metallurgical vessel of large capacity, the supply is effected alternately with at least two intermediate vessels of less capacity which are emptied by tipping one after the other. This enables, on the one hand, precise control to be achieved, and, on the other hand, the making use of the time of emptying of the one vessel for the readying or filling of the other vessel. It will be understood that, knowing the time necessary for readying or filling an intermediate vessel, the capacity of the intermediate vessels can be arranged to be such that, during the emptying of one, the filling or readying of another full intermediate vessel can be effected. There is, therefore, no interruption in the procedure which results in a continuous supply of metal.

Figure 2:
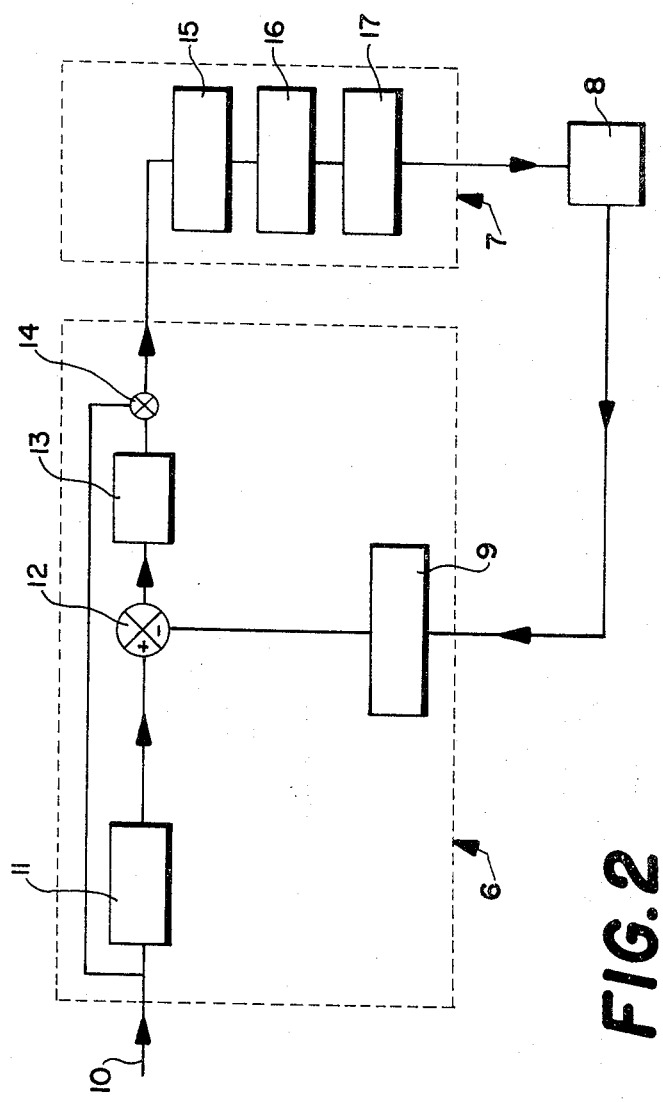

An embodiment of the invention will now be described, by way of example, with reference to the accompanying drawings, in which:

FIG. 1 is a diagrammatic representation showing an embodiment of the present invention; and FIG. 2 is a diagram of the flow regulation.

There is shown in FIG. 1, in a very simplified form one possible embodiment of a supply device comprising a primary ladle 1 which feeds two intermediate vessels 2 and 3. As shown, ladle 1 is located on a tipper and discharges into a runner conduit 4 whose direction of extension can be selected to enable supply of the metal to one or another of the intermediate vessels. In the situation shown, vessel 2 is in the process of being filled by flow through conduit 4, and vessel 3 is in the process of emptying or discharging its supply of molten metal through a two-branched channel 5. It is to be understood that feed ladle 1 is operable to fill intermediate vessels 2 and 3 alternately. In the embodiment shown, this switching of the direction of flow of the metal from ladle 1 is effected by swinging or pivoting conduit 4, but it could be achieved by displacement of the ladle while suspended on a bridge, or by displacement of the ladle along rails. In order to maintain the regulation of the feed, vessels 2 and 3 are weighed as they discharge by known means (not shown), for example, by means of an extensometric-gauge measuring bridge such as is described in French Pat. No. 1473044. Tipping is effected, for example, by hydraulic jacks (not shown) which are so disposed that the value of their support reaction does not interfere with the weighing of the vessels.

Reverting to FIG. 1, it will be understood that the continuity of the feed is insured by the alternate filling-up of one of the intermediate vessels and the tipping of the other during filling-up of the one. When supply ladle 1 is empty, it is replaced by another, the capacities of the three vessels being predetermined in order that this change-over, as well as the possible replacement of an intermediate vessel can be effected without interrupting the feed, i.e., during the period of emptying of an intermediate vessel.

In order to insure the regular feed of metal, the intermediate vessels are weighed at each instant in the course of emptying as to the weight of metal emptied and the feed of metal to be calculated. Then, in a regulator device, this feed is compared with a reference feed and the difference acts upon the tipping rate so that this difference can be eliminated. It is obvious that any parameter could be used as a reference parameter as long as it related to the feed without thereby departing from the regulator principle.

When an intermediate vessel is almost empty, a signal, for example a minimum weight reached, automatically initiates the tipping of the second intermediate vessel. This tipping is effected at high speed until the flow of metal is detected by suitable means such as photoelectric cells. For the next step, two manners of procedure may then be considered.

In one of these, the excitation of the feed-detection means causes, on the one hand, the stopping of the feed to the one intermediate vessel at the end of discharge, for example by causing quick return to the initial disposition of this vessel, and on the other hand the taking over by the regulator of the control of the rate of tipping of the second vessel at this time. In this case there is therefore complete interruption in one metal feed and its replacement by another.

In the other procedure, the excitation of the feed-detection means causes, on the one hand, stoppage of the tipping of the one vessel at the end of discharge while allowing the one vessel to continue decreasing feed, and on the other hand, the taking over by the regulator of the control of the rate of tipping of the second vessel. For a few moments (up to stoppage of the feed of the first vessel), the regulation acts so that the sum of the two feeds is equal to the reference feed; and there is overlapping of the two tippings.

Referring now to FIG. 2, the regulation device will be described.

In FIG. 2, which diagrammatically represents the regulation circuit, it is separated into two parts, the first of which, denoted by the reference numeral 3, insures the regulation; and the second of which, denoted by the reference numeral 7 insures the tipping of one intermediate vessel. The latter part, as well as the weighing means 8, is common to each vessel, and there are as many such parts and weighing means as there are intermediate vessels. The weighing means 8 constantly provides the weight of the vessel in the course of emptying, a datum which is introduced into regulation part 6 through the intermediary of an analyzer 9 which provides a signal representing the weight of metal which has been emptied. Moreover, a reference feed quantity 10 is fed into regulation part 6 which makes available, through the intermediary of a timer 11, the weight of metal provided for the feed. These two quantities, namely the weight of metal provided and the weight of metal emptied, are introduced into a differential counter 12 which develops a differential signal that is then treated by an integrating regulator 13 which supplies a voltage which, as can be seen, is added to the reference voltage at 14. This voltage is applied to the tipping assembly which comprises a variator 15 and a motor 16 which controls the tipping of an intermediate vessel 17. It will readily be understood that any difference in the measured flow of metal in relation to the reference quantity gives rise to an appropriate change in the supply voltage of motor 16 controlling the tipping so as to eliminate the recorded difference in flow. In the event of two flows of metal momentarily co-existing, the sum of the two is introduced into the regulation assembly and the flow is regulated by acting upon the flow of metal running out of the intermediate vessel at the start of tipping.

It will be noted that this metal flow device and the regulation assembly is capable of operating whatever the shape of the intermediate vessels, and that they enable compensation of any variation in their internal form which could occur through wearing of their refractories.

What is claimed is:

1. A method of supplying a substantially constant flow of molten metal from at least two intermediate tipping vessels provided with means controlling their rate of tipping, comprising tipping one of said vessels that is full to obtain a discharge flow of metal, continuously weighing said one vessel as it is being discharged so as to determine the diminishing flow of metal running out of said vessel, comparing said diminishing flow of metal with a reference quantity representing a constant feed flow of molten metal to the vessels, developing from the comparison of determined flow and the reference quantity a differential signal corresponding to the difference in their values, modifying the tipping rate of said one vessel while metal is running out therefrom so as to bring said differential signal back to a substantially zero value, stopping the tipping of said one vessel while metal is running out therefrom, and initiating the tipping of the other vessel that is full when the one vessel from which metal is running out reaches a predetermined degree of emptying.

2. A method according to claim 1, including detecting the appearance of flow of metal from the one vessel at the start of tipping, developing a signal at the moment when such flow of metal appears, initiating through said signal the elimination of the flow of metal from the other vessel at the end of tipping and initiating through said signal the switching of the controlling means for regulating the rate of tipping from said other vessel to the one vessel at the start of tipping.

3. A method according to claim 1, including detecting the appearance of flow of metal from the one vessel at the start of tipping, developing a signal at the instant such flow appears, and by means of said signal, causing stoppage of the tipping of the other vessel, the metal continuing to be emptied from said other vessel at a decreasing rate, initiating the switching of the controlling means for regulating the rate of tipping from said other vessel to the one vessel at the start of tipping, and initiating the summation of the flows from the two vessels to develop the differential signal for regulating the rate of tipping of said one vessel.

4. A method according to claim 1, in which the initiating of the tipping of a vessel is provided by a predetermined weight of the other vessel.

5. A method according to claim 1, in which the initiating of the tipping of a vessel is provided by a geometrical portion of the other vessel.

6. A method according to claim 1, in which the emptying of the vessel generates a changing voltage, the reference quantity is a constant voltage, and the difference in the two voltages generates the differential signal as a voltage for controlling the rate of tipping.

* * * * *